Dec. 2, 1947.　　J. M. GWINN, JR　　2,432,005
AIRCRAFT CONTROL SURFACE ACTUATOR
Filed Sept. 18, 1944

INVENTOR.
JOSEPH M. GWINN, JR.
BY
Bean, Brooks, Buckley & Bean.

Patented Dec. 2, 1947

2,432,005

UNITED STATES PATENT OFFICE 2,432,005

AIRCRAFT CONTROL SURFACE ACTUATOR

Joseph M. Gwinn, Jr., San Diego, Calif.

Application September 18, 1944, Serial No. 554,630

9 Claims. (Cl. 244—83)

This invention relates to aircraft and more particularly to improvements in airplane control devices so as to provide an elevation and turning control which closely resembles in external appearance the conventional automobile type steering column and steering wheel.

Elevation and turning control devices for aircraft usually connect to elevator and aileron or rudder surfaces, and it is an object of the present invention to connect the pilot control device to such elevator and turn control surfaces and to provide the control device to be rockable about an axis below the passenger compartment floor line for fore and aft motion of the elevator control elements; the motion of the control device of the invention at its position of extension through the floor lines being substantially parallel to the longitudinal axis of the control device, thus permitting a substantially air-tight sliding connection between the control device and the floor structure.

Another object of the invention is to provide in an airplane an improved fore and aft rocking control column mounting arrangement whereby to facilitate ventilation and temperature control and sound proofing of the airplane passenger compartment.

Another object of the invention is to provide an improved elevation and turning control for airplanes comprising a conventional automobile type control post and wheel unit so arranged as to avoid interference with the legs and feet of the pilot and passengers.

Another object of the invention is to provide in a pilot control device of the character aforesaid a counterbalancing mechanism so arranged that forces of gravity acting upon the mass moving around the axis of fore and aft rocking of the pilot control device are translated into forces acting automatically to adjust the setting of the connected control surfaces in an improved and preferred manner. Other objects and advantages of the invention appear in the specification hereinafter.

Figure 1:
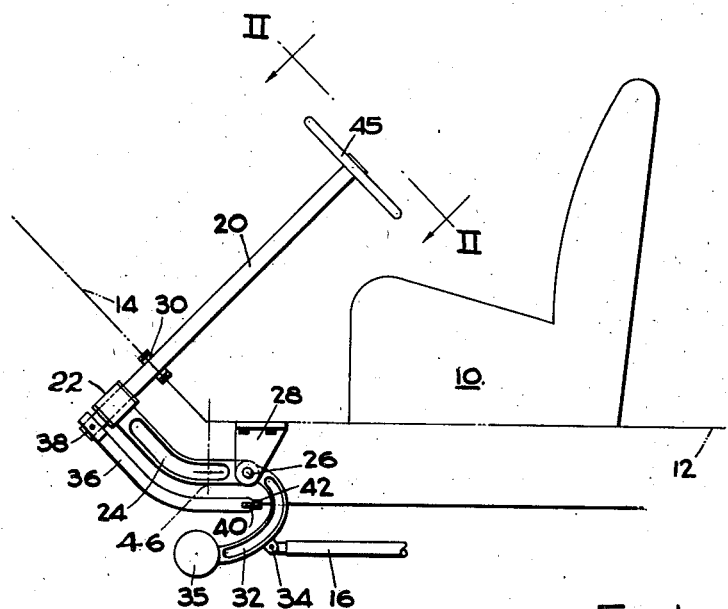
Fig. 1 is a side elevation of a pilot control arrangement of the invention.
Figure 2:
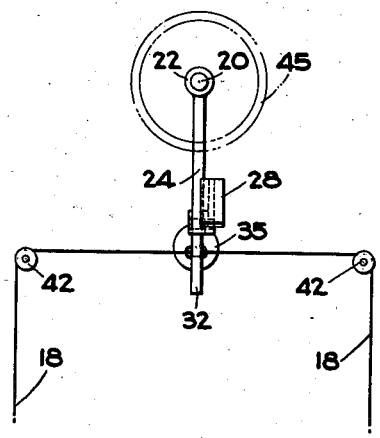
Fig. 2 is a fragmentary top plan thereof, as taken along line II—II of Fig. 1.

The drawing illustrates the invention as being applied to an airplane including a passenger compartment containing a seat 10 and having a floor line 12 with an upwardly sloping front floor line 14 at positions ahead of the pilot and passengers seated beside the pilot. It is contemplated that the airplane to which the invention is applied will employ a longitudinal pitch control device such as a conventional elevator type adjustable airfoil at the empennage or wing flaps, or the like; and that a suitable actuating device will be extended from connection to the elevator or flaps into the region of the pilot control devices, such as the push-pull member designated 16. Also, it is contemplated that the airplane may employ suitable turn control surfaces such as ailerons or rudders, to be actuated by means of flexible cables 18—18 leading forwardly toward the position of the pilot control device.

The pilot control device of the invention is shown to comprise a column 20 which is journaled within a bearing block 22 carried by a bracket 24 disposed below the floor line of the airplane passenger compartment. The bracket 24 is pivotally mounted at 26 upon an arm 28 which is fixed to the airplane structure, and the bracket 24 is so shaped as to support the column 20 to be substantially longitudinally displaceable relative to an apertured portion of the floor structure as illustrated at 30. This is accomplished by disposing the axis of the pivot connection 26 in a plane extending normal to the long axis of the column 20 from a point thereon at its intersection with the floor line 14. It is only by such an arrangement as this that forward and rearward rocking movements of the control column require minimum lateral displacements of the column in the plane of the floor line 14.

The bracket 24 is formed with a crank or horn 32 for pivotal connection at 34 with one end of the elevator control push pull member 16. A second crank or horn 36 (Fig. 1) is keyed to the bottom end of the column 20 as at 38 and extends rearwardly therefrom substantially parallel to the extent of the bracket 24 to a position below and closely adjacent the pivot connection 26, and the horn 36 carries at its rear end a connector 40 which couples to the turn control cables 18—18 at opposite sides of the horn 36; the cables 18—18 being trained around pulleys 42—42 carried at opposite sides of the airplane frame so as to lead the cable end portions into connection with the horn 36 from opposite sides thereof while avoiding interferences with the horn 32. The column 20 carries at its upper end a hand wheel 45. Thus, it will be understood that upon rotation of the hand wheel 45 about the longitudinal axis of the column 20 the horn 36 will be thereby oscillated to displace the cable system 18—18 in such manner as to cause simultaneous reverse direction operations thereof for actuation of the connected turn control surfaces, as will be understood by persons versed in the airplane art. A counterweight 35 is fixed to a forwardly curving end portion of the horn 32 so as to provide the combined center of gravity of the movable control device and counterweight unit to be slightly forwardly of the pivot axis 26 but at about substantially the same elevation, as indicated at 46 in Fig. 1 under normal operating conditions which usually would not exceed a 30° angle of dive. This arrangement will provide that normally the counterweight will tend to pull the control column down and nose the airplane down, and this will necessarily be compensated for by other trim means such as by arranging the center of gravity of the complete airplane to be further aft than would otherwise be the case.

During level flight the air pressure forces under the elevator oppose the downward tilting tendencies of the control column, but these forces vary as the square of the speed of flight. Consequently, for example, upon deflection of the airplane from normal flight, such as when diving, the airspeed will increase and the forces tending to lift the elevator will exceed the forces of the counterweight and thereby pull the control column back while the elevator rises. This provides automatic stability for the airplane flight. The reverse is true, for example, if for some reason the airplane assumes less than the proper speed for a given trim; the pressures under the elevator will then be decreased and the control column will be permitted to move further forwardly, thereby tending to raise the tail and nose the airplane down to increase the speed thereof. If the stabilizing operations tend to become so great as to impose substantial dynamic loads upon the airplane, such dynamic loads acting on the combined mass of the control column and the counterweight tend to further move the control column forward, thus reducing the maneuver supplying the dynamic loads. Thus, the system is self-damping and "hunting" is avoided. This is very important because it is particularly applicable to large high speed aircraft wherein it is impractical for example to mount a counterweight behind the elevator hinge in order to obtain an equivalent stabilizing action, because if a counterweight be added directly to the elevator in a high speed airplane it will introduce fluttering tendencies. In a high speed airplane the control surfaces must be counterweighed so as to dispose the combined C. G. at or forward of the hinge line.

Therefore, this invention provides an improved means for stabilizing a control surface because it simultaneously stabilizes the surface and the pilot control column. Also, the invention is advantageous because the counterweight is carried at about the C. G. of the complete airplane, and this avoids disturbing the usual position of the center of gravity. Preferably, the horn 36 of the turn control mechanism is formed to terminate in close proximity to the axis of the pivot connection 26 whereby disturbances of the turn control system incidental to fore-and-aft rocking of the control column will be at a minimum.

Thus, it will be appreciated that the invention provides a novel airplane control device of improved simplification wherein the pilot-movable element thereof resembles the steering column and wheel unit of a conventional automobile; said control unit being rockable fore-and-aft to procure longitudinal pitch control effects and rotatable about the longitudinal axis of the control column to procure turning control of the airplane. Thus, the invention deals with a pilot-control mechanism which is of such form as to engender a feeling of familiarity on the part of a person acquainted with modern automobile operation when first learning to control the airplane to which the invention is applied. Also, it will be appreciated that the specific mounting and counterbalancing arrangement of the invention provides the control device of the invention to provide automatic control effects of improved form whereby to further simplify pilot-operation of the airplane and to reduce the degree of control technique skill required of the pilot for safe handling of the airplane.

It will be understood that although only one specific form of the invention has been shown and described in detail it will be apparent to those skilled in the art that the invention is not so limited that various changes may be made therein without departing from the spirit of the invention or the scope of the appended claims.

I claim:

1. In an airplane, a control surface actuator, and a pilot-operable control device for actuation of said control surface actuator, said control device comprising an elongate control member disposed to extend through a floor portion of the airplane and being mounted upon a pivotal connection with the airplane frame at a position laterally remote of said control member and in a plane extending substantially normal to the said longitudinal axis of said control member at the position of intersection of the control member with the floor line of said airplane, and motion transmitting means interconnecting said member and said control surface actuator for actuation of the latter in response to rocking of said control member about said pivot axis.

2. In an airplane, a longitudinal control surface actuator, and a pilot-operable control device for actuation of said control surface actuator, said control device comprising a control member disposed to extend through a floor portion of the airplane and being mounted for fore and aft rocking motion upon a pivotal connection with the airplane frame at a position laterally remote from said control member and in a plane extending substantially normal to the longitudinal axis of said control member at the position of its intersection with the floor line of said airplane, and motion transmitting means interconnecting said member and said control surface actuator for actuation of the latter in response to rocking of said control member about said pivot axis.

3. In an airplane, a longitudinal pitch control surface actuator, a turn control surface actuator, and a pilot operable control device for selective actuation of said pitch and turn control surface actuators, said control device comprising a hand wheel carried at one end of a control column disposed to extend through a floor portion of the airplane, means extending from said control column and responsive to rotations of said hand wheel and connecting to said turn control surface actuator for actuating the latter in response to rotations of said hand wheel, said column extending into pivotal connection with the airplane frame at a position laterally remote from said column and in a plane extending substantially normal to the longitudinal axis of said column at the position of its intersection with the floor line of said airplane, and means carried by said column and connecting to said longitudinal pitch control surface actuator for actuation of the latter in response to fore and aft rocking of said control column about said pivot axis.

4. In an airplane, a longitudinal pitch control surface actuator, a turn control surface actuator, and a pilot operable control device for selective actuation of said pitch and turn control actuators, said control device comprising a hand wheel carried at one end of a control column disposed to extend through a floor portion of the airplane, means extending from said control column and responsive to rotations of said hand wheel and connecting to said turn control surface actuator for actuating the latter in response to rotations of said hand wheel, said column being movably supported about a pivotal axis upon the airplane frame to be movable at its intersection with the floor in a direction substantially parallel to the longitudinal axis of said column thereat, and means carried by said column and connecting to said longitudinal pitch control surface actuator for actuation of the latter in response to fore and aft movement of said control column about said pivot axis.

5. In an airplane, a control surface actuator, and a pilot-operable control device for actuation of said control surface actuator, said control device comprising a control member disposed to extend through a floor portion of the airplane and being movably mounted upon the airplane frame at a position laterally remote from said control member and in a plane extending substantially normal to the longitudinal axis of said member at the position of its intersection with the floor line of said airplane so as to be movable at its intersection with the floor in a direction substantially parallel to its longitudinal axis thereat, and motion transmitting means interconnecting said member and said control surface actuator for actuation of the latter in response to pilot-moving of said control member.

6. In an airplane, a longitudinal pitch control surface, a turn control surface, and a pilot operable control device for selective actuation of said pitch and turn control surfaces, said control device comprising a hand wheel carried at one end of a control column disposed to extend through a floor portion of the airplane, horn means extending radially from the bottom end of said control column and responsive to rotations of said hand wheel about the longitudinal axis of said column, said column being mounted upon a bracket extending into pivotal connection with the airplane frame at a position laterally remote from said column and in a plane extending substantially normal to the longitudinal axis of said column at the position of its intersection with the floor line of said airplane, crank means carried by said bracket, motion transmitting means interconnecting said crank means and said longitudinal pitch control surface for actuation of the latter in response to fore and aft rocking of said control column about the axis of said pivotal connection, said horn being extended into close proximity to said axis of pivotal connection and connected thereat to motion transmitting means, said motion transmitting means interconnecting said horn and said turn control surface for actuating the latter in response to rotations of said hand wheel.

7. In an airplane, a longitudinal pitch control surface actuator pivotable upon the airplane to regulate the pitch attitude of the airplane, a turn control surface actuator, and a pilot-operable control device for selective actuation of said pitch and turn control actuators, said control device comprising a hand wheel carried at one end of a control column disposed to extend through a floor portion of the airplane, first crank means extending radially from the bottom end of said control column and responsive to rotations of said hand wheel about the longitudinal axis of said column, motion transmitting means interconnecting said first crank and said turn control surface for actuating the latter in response to rotations of said hand wheel, a bracket rotatably mounting said column, a pivotal connection device engaging said bracket at a position spaced from the mounting of said control column and interconnecting said bracket about a pivot axis disposed at a position in a plane extending substantially normal to the longitudinal axis of said column at the position of its intersection with the floor line of said airplane, a second crank carried by said bracket, motion transmission means interconnecting said second crank and said longitudinal pitch control surface actuator for actuation of the latter in response to fore and aft rocking of said control column about said pivot axis, and counterweight means connected to said bracket and so disposed as to regulate the center of gravity of the combined control device and counterweight means to be positioned forwardly of said pivot axis and at approximately the elevation thereof, said control device and said pitch control surface actuator and said pitch control motion transmission means being constructed and arranged to provide the surface pitch control system to be statically unbalanced in favor of nose-down pitching of the airplane.

8. In an airplane having a wall, a longitudinal pitch control surface actuator, a turn control surface actuator, and a pilot operable control device penetrating said wall for selective actuation of said pitch and turn control actuators, said control device comprising a hand grip carried at one end of a control column, means extending from said control column and responsive to rotations of said hand grip and connecting to said turn control surface actuator for actuating the latter in response to rotations of said hand grip, said column being pivotally supported with respect to the airplane structure to partake of a push-pull motion at the hand grip in a direction substantially parallel to the longitudinal axis of said column, the axis of said pivotal support lying substantially in the plane of said wall and offset from the axis of said column, means secured to said column and connecting to said longitudinal pitch control surface actuator for actuation of the latter in response to push-pull movement of said control column, and counterweight means biasing said column to normally assign a diving position to said pitch control surface actuator.

9. In an airplane, a longitudinal pitch control surface and a pilot-operable control device for actuation of said surface, said control device comprising an arm, said arm being mounted upon said airplane by a pivot connection device and extending forwardly therefrom, a pilot control member including a hand grip portion rotatably mounted upon the forwardly extending portion of said arm, a counterweight attached to said arm to extend therefrom to a position below said pivot connection device, motion transmission means interconnecting said arm and said control surface for actuation of the latter in response to pivoting of said arm, said control device being constructed and arranged so that the center of gravity thereof is under all normal operating conditions disposed ahead of the axis of said pivot connection device, whereby the surface control system is always statically unbalanced in favor of adjustment thereof to cause nose-down pitching of the airplane to induce increased speed of flight which in turn induces increased aerodynamic reaction against said surface so as to counter the pull of the static unbalance effects whereby to maintain flight speed.

JOSEPH M. GWINN, Jr.

REFERENCES CITED

The following references are of record in the file of this patent:

UNITED STATES PATENTS

| Number | Name | Date |
|---|---|---|
| 911,770 | Dingfelder | May 9, 1911 |
| 1,060,115 | Ohlson | Apr. 29, 1913 |
| 1,067,432 | Jenkins | July 15, 1913 |
| 1,180,271 | Tabox | Apr. 18, 1916 |
| 1,714,170 | Jette | May 21, 1929 |
| 1,782,149 | Salisbury et al. | Nov. 18, 1930 |
| 1,802,130 | Van Dusen | Apr. 21, 1931 |
| 1,813,485 | Cook | July 7, 1931 |
| 1,822,082 | Davis | Sept. 8, 1931 |
| 2,005,061 | Thomas | June 18, 1935 |
| 2,227,784 | Koch | Jan. 7, 1941 |
| 2,240,259 | Gwinn | Apr. 29, 1941 |

FOREIGN PATENTS

| Number | Country | Date |
|---|---|---|
| 458,751 | Great Britain | Dec. 28, 1936 |